July 13, 1965

B. B. DUNNE 3,194,207

UNDERWATER SOUND SOURCES

Filed May 8, 1961

Inventor
BRIAN B DUNNE
By Soans, Anderson, Luedeka & Fitch
Attys

United States Patent Office 3,194,207
Patented July 13, 1965

3,194,207
UNDERWATER SOUND SOURCES
Brian B. Dunne, San Diego, Calif., assignor to General Dynamics Corporation, New York, N.Y., a corporation of Delaware
Filed May 8, 1961, Ser. No. 108,553
6 Claims. (Cl. 116—27)

This invention relates to underwater sound sources, and more particularly to a nuclear reactor powered, high intensity underwater sound source.

In line with the numerous technological advances that have been made in recent years, the need for an efficient and reliable underwater sound source which may be utilized in various scientific, military and commercial programs has become increasingly more apparent. More particularly, there is a demand for an effective underwater sound source which, among other things, is suitable for obtaining detailed measurements of ocean currents, determining water temperatures at selected depths and yielding information relating to the transmission characteristics of underwater sound waves over a long distance. A device which is capable of carrying out the above enumerated functions would be of still greater value if adapted for use as a navigational instrument and/or if suitable for utilization in various naval, geophysical prospecting and commercial fishing applications.

While numerous possibilities exist for the application of an effective and reliable underwater sound source, devices developed heretofore have been limited, for the most part, to a single functional application. Moreover, these devices have proven incapable of producing intense underwater sound pulses which can be transmitted over a substantial distance. Prior attempts to develop a sound source which is sufficiently versatile and yet reliable have proven to be so costly as to outweigh the other advantages of such a device.

Accordingly, it is a prime object of this invention to provide a new and improved underwater sound source.

A further object of this invention is to provide a reliable and efficient underwater sound source which is capable of producing intense low frequency sound pulses that can be transmitted over long distances.

A more specific object of the invention is to provide an efficient, reliable and economical reactor powered sound source that may be utilized in such diverse fields as geophysical prospecting, underwater communications and in numerous other scientific, military and commercial applications.

Figure 1:
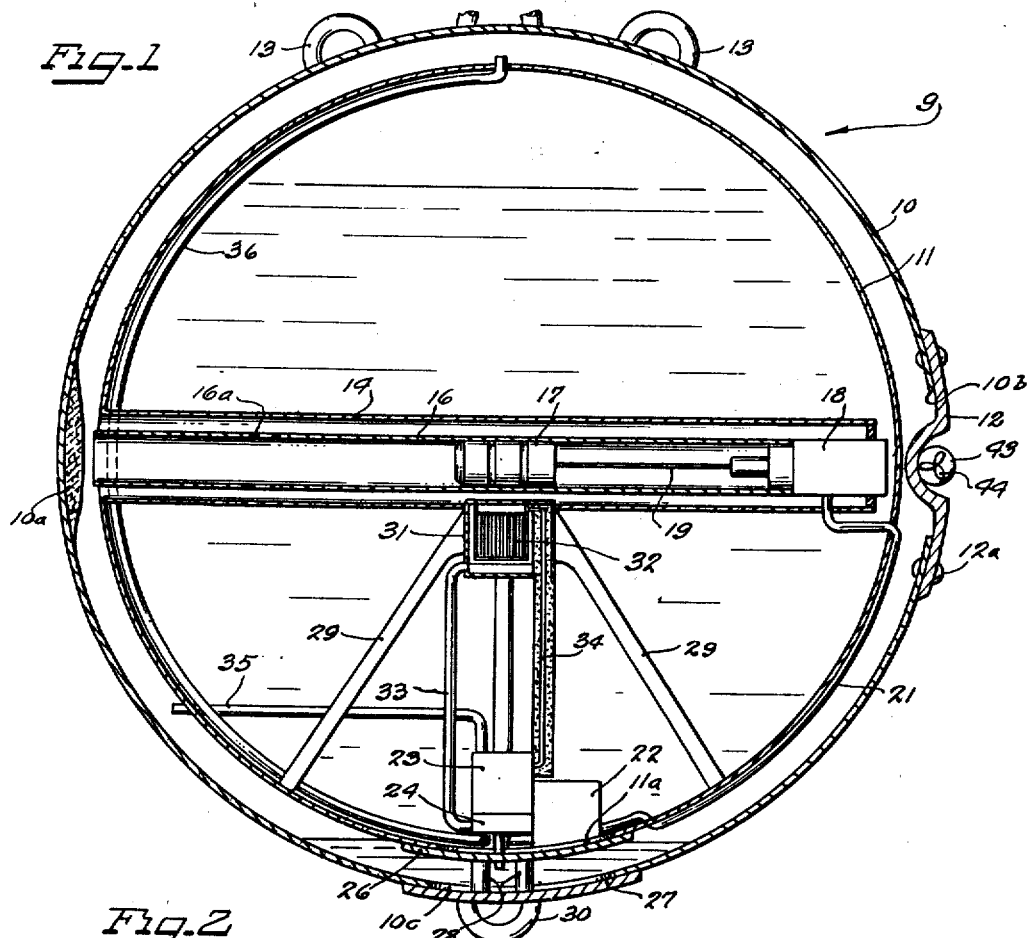
Figure 2:
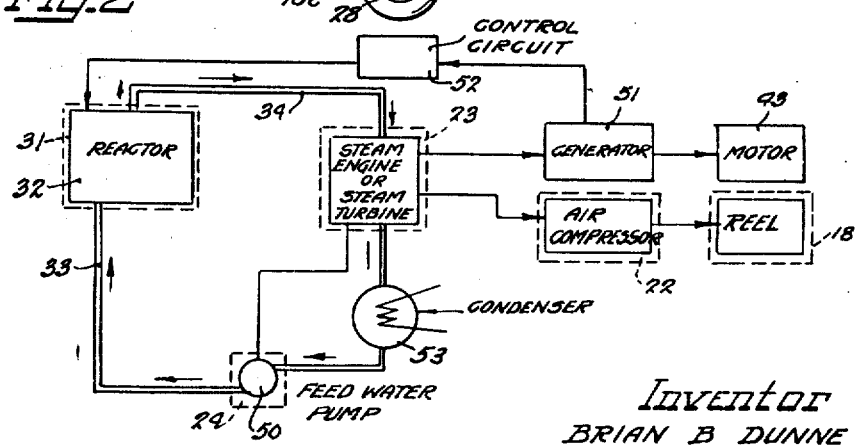

Other objects and advantages of the present invention will become apparent from the following detailed description when considered in conjunction with the accompanying drawings wherein:

FIGURE 1 is a vertical cross-sectional view of a nuclear reactor powered, high intensity sound source embodying the principal features of the present invention; and FIGURE 2 is a diagrammatic representation of a power system which may be used in conjunction with the apparatus illustrated in FIGURE 1 to produce high intensity, low frequency, underwater sound pulses.

In general, the reactor powered, underwater sound source illustrated in FIGURE 1 includes a pair of concentric spheres which houses a reactor and associated pneumatically controlled, vibration producing apparatus that generates intense underwater, low freqnuency sound pulses. A supply of water is pumped to and through the nuclear reactor mounted within the inner sphere to effect cooling of the reactor. The water which passes through the reactor is vaporized thereby resulting in the production of steam which is thereafter circulated through a non-condensing steam engine that functions to generate pneumatic power. The steam exhausted from the engine is circulated through the space provided between the inner and outer spheres. This space serves as a condenser for the exhausted steam which is recondensed and recirculated by the pump through the reactor to sustain continuous operation of the engine.

The generated pneumatic power drives a floating piston or hammer through a tubular chamber mounted within the inner sphere. The impact of the piston on a reinforced section of the outer sphere creates an intense vibration of the reinforced section and, accordingly, produces a low frequency sound pulse. Other apparatus mounted within the inner sphere and controlled by the pneumatic power generating system is selectively rendered effective to return the piston to an initial position subsequent to each actuation thereof.

Referring now in detail to FIGURE 1, there is disclosed an underwater sound source, generally designated by the numeral 9, that includes an outer spherical shell 10 which encompasses and is concentric with an inner spherical shell 11. In a preferred embodiment of the invention, each of the spheres or shells 10 and 11 is fabricated of a material such as steel. Suitable shock absorbing devices, which maintain the walls of the shells in uniform spaced relation in a manner hereinafter described, are provided between and insulate the innner spherical shell from vabratory shock pulses imparted to the outer shell.

The outer spherical shell 10 is provided with a reinforced section 10a that has a thickness substantially larger than the thickness of the remaining portions thereof and oppositely disposed to this reinforced section is a circular opening 10b over which an access plate 12 is mounted. The access plate 12 is removably secured to the outer sphere in watertight relation by a plurality of bolts 12a. Secured to and projecting upwardly from the upper surface of the sphere (as viewed in FIGURE 1) are a plurality of hoisting eyes 13 whereto suitable hoisting apparatus (not shown) can be secured so that the lowering and raising of the spherical shell into and out of water can be readily effected.

The inner sphere 11, a substantial portion of which is preferably filled with distilled water, encases and supports the major portion of the control apparatus and the pneumatically controlled pulsing device that effects the production of intense underwater sound pulses. Extending from the wall of the inner sphere 11 and substantially across the entire diameter thereof is a cylindrical watertight casing 14. The casing 14 encompasses a tubular chamber 16 which extends slightly beyond the peripheral surface of the inner sphere adjacent the reinforced section 10a.

The tubular chamber 16 houses a piston 17 that is slidably mounted therein for movement toward and away from the reinforced section 10a of the outer sphere 10. In a normal or unactuated position the piston 17 is situated substantially in the center of the tubular chamber and, accordingly, at the center of radius of both the outer and inner spheres 10 and 11. The tubular chamber 16 is further provided with an outlet port 16a which is formed in the wall of the chamber near the projecting extremity thereof.

Situated at the end of the tubular chamber, which is oppositely disposed to the projecting portion thereof, is a housing 18 for a tank of compressed air and a pneumatically operated return reel (not shown), which may be any one of several commercially available types. Extending from the casing 18 toward the piston or hammer 17 and secured to the latter is a flexible cable member 19 that functions to return the piston 17 to a normal or unactuated position subsequent to the advancement thereof into engagement with the reinforced section of the outer sphere. Rewinding of the flexible cable is effected by the pneumatically operated return reel when air is supplied thereto from the tank. The tank, in turn, is fed through a supply lie 21 from a conventional air compressor (not shown) mounted within a watertight casing 22.

The casing 22 for the air compressor is mounted at the lower extremity of the inner sphere and, as illustrated in FIGURE 1, is positioned adjacent a pair of vertically aligned watertight housings 23 and 24. A non-condensing steam engine and conventional feed water pump for returning condensed water to the nuclear reactor are mounted within the housings 23 and 24 and are utilized in the production of power for the pneumatic pulsing means.

An access plate 26 is mounted over a circular aperture 11a provided in the inner sphere 11 below the housings for the steam engine, pump and air compressor. Mounted in alignment therewith over a circular aperture 10c in the lowermost section of the outer sphere 10 is a second access plate 27. As described in conjunction with the access plate 12, each of the plates 26 and 27 are suitably secured, in watertight relation, to the walls of the spheres and can be removed to allow ingress into the inner portion of either or both of the spheres. Secured to and projecting downwardly from the lower access plate 27 is an anchoring ring 30 which may be utilized to maintain the underwater sound source in a fixed location by the attachment of suitable anchoring apparatus thereto.

Interposed between the inner and outer spheres adjacent the access plates 26 and 27 is a pair of shock absorbers 28. The shock absorbers serve to absorb a major portion of the shock and vibration imparted to the outer sphere as a result of the impact of the piston 17 on the reinforced section thereof. Additional shock absorbers (not shown) are positioned at various other advantageous locations between the inner and outer spheres. These additional absorbers aid in precluding any appreciable amount of vibration being imparted to the inner sphere that houses the major portion of the control apparatus, while simultaneously allowing intense vibratory motion of the outer sphere.

Referring more specifically to the arrangement of the various control devices within the inner sphere 11, there is illustrated in FIGURE 1 a plurality of support brackets 29 which extend upwardly and inwardly from the wall of the inner sphere and serve to support a housing 31 wherein a diagrammatically represented nuclear reactor 32 is mounted. The nuclear reactor utilized in a preferred embodiment of the invention is essentially a "boiling water" reactor wherein water is boiled in the core region to produce steam.

The reactor 32 is constructed so that inherently safe and prolonged operation thereof is assured. More particularly, the reactor core is designed so that the power level thereof is suitably controlled, and this control is insured by a prompt negative temperature coefficient of reactivity and a negative void coefficient of reactivity which characterize the reactor. The prompt negative temperature coefficient of reactivity, which stems for the most part from the composition of a plurality of fuel elements provided for the reactor, effects a reduction in reactivity and therefore in the power level of the reactor when heating of the fuel elements is caused by a power level increase. Similarly, a power level increase will result in the increased formation of steam voids in the upper portion of the core region so that a reactivity and hence a power level reduction is effected.

Although diagrammatically illustrated in FIGURES 1 and 2, the reactor 32 that is mounted within the housing 31 includes a single control rod as well as a number of burnable poison rods that are mounted in suitably proportioned apertures within the core of the reactor. The fuel elements and burnable poison rods are disposed in a conventional manner within the core so as to assure optimum reactor efficiency for prolonged intervals of operation. Suitable means are also provided for automatically withdrawing and positioning the single control rod so that the reactor can be brought up to a critical power level and maintained at this power level during the prolonged periods of operation.

As illustrated in FIGURE 1, a conduit member 33 extends from the housing 24 and, more particularly, from the water pump mounted therein. The conduit member 33 is in turn connected to the reactor 32 and functions to carry water supplied by the pump to and through the reactor core wherein vaporization of the water is effected to produce steam. Preferably, the vaporized water or wet steam is supplied through an insulated conduit member 34 to a steam engine (not shown) which is mounted within the housing 23.

The steam engine may be one of several commercially available non-condensing types, for example a Corliss steam engine, which is adapted to control and render various power means for the sound source 9 effective. More particularly, the Corliss engine is mechanically coupled to and drives the air compressor, the water pump and a suitable power generator for a control system (FIGURE 2), all of which are maintained within the inner sphere 11. While a Corliss steam engine is well adapted to provide the necessary power to maintain the continuous operation of the underwater sound source, it is apparent that a steam turbine could also be utilized for this purpose. Various commercial models of steam turbines are available for use which can be maintained in sustained operation for prolonged periods. However, an impulse type steam turbine which utilizes the principle of velocity staging and which is provided with suitable centrifugal speed governing means would be preferable as an alternate power producing means to replace the steam engine in the underwater sound source.

Steam supplied to the steam engine (or steam turbine) from the reactor sustains the continuous operation thereof. Accordingly the air compressor within the housing 22 is maintained in operation to compress and supply air from the space between the inner and outer spheres 10 and 11 to the compressed air tank mounted within the housing 18. The air is fed from the space between the uppermost portion of the spheres through a supply line 36 to the compressor. Thereafter the compressed air is passed through the supply line 21 to the tank. When sufficient pressure has been built up within the tank the air contained therein is selectively exhausted by the actuation of a conventional relief valve (not shown) into the tubular chamber 16 to accelerate the piston into engagement with the outer sphere.

The pneumatically powered piston 17, upon engaging the reinforced section 10a of the outer sphere, effects the intense vibration thereof and, accordingly, an intense low frequency sound impulse is transmitted thereby. This vibration of the outer sphere is insulated from the inner sphere by the shock absorbers previously described so that the various structural components mounted therein are not adversely affected by the shock of vibration as the outer sphere vibrates within the water medium.

Upon completion of the pulse producing advance stroke of the piston 17, the piston is positioned within and in close proximity to the projecting extremity of the chamber. Accordingly, the pneumatic pressure supplied to the chamber during the advance stroke of the piston is exhausted to the outlet port 16a provided in the wall of the chamber. The exhausted air re-enters the space between the inner and outer spheres and is recirculated through the supply line 36 and compressor to maintain the pressure within the tank. The compressed air retained in the tank subsequent to the advancement of the piston 17 is utilized to render the pneumatically operated reel effective and thereby return the piston to an intial position near the center of the tubular chamber 16. The acceleration of the piston, the production of intense low frequency sound pulses, and the return of the piston to an initial position in a repetitive manner result from the continuous operation of the pneumatic power system.

Similarly, steam is continuously created for sustaining the Corliss engine in an operative state. More particularly, the exhausted steam from the Corliss engine is passed by a conduit member 35 into the space between the inner and outer spheres which serves as a steam condenser. Inasmuch as sea water, wherein the sound source is submerged, encompasses the wall of the outer sphere, the steam exhausted from the Corliss engine upon entering the space between the spheres becomes condensed, the heat of condensation being passed into the surrounding sea water. The resulting condensate accumulates at the lowermost portion of the sound source between the walls of the spheres. The water or condensate accumulated at this location is selectively recycled by the feed water pump through the reactor to effect the cooling thereof and the production of steam in the manner hereinbefore described.

Orientation of the phere and the maintenance thereof in a stable, balanced state is enhanced inasmuch as the major portion of the weight of the various control devices and, accordingly, the center of gravity of the sound source, is below the center of buoyancy thereof. Moreover, the sphere is provided with an electrically powered motor 43 which functions to drive a sphere rotation propellor 44 to effect angular rotation of the source 9. The rotation propeller 44 is driven through a shaft (not shown) by the watertight motor that is secured to and mounted on an inwardly curved, concave portion of the access plate 12. Power is supplied to the motor 43 from the generator through suitable watertight conductors so that during the selective operation of the pulsing device the motor can be rendered effective to rotate the sphere in any direction desired.

Mode of operation

The operation and capabilities of the underwater sound source 9 will be more fully appreciated when considered in conjunction with FIGURE 2. Water from the diagrammatically represented feed water pump 50, which is mounted within the housing 24, is circulated through the conduit member 33 to the reactor 32. As a result of the passage of water therethrough, the reactor is cooled and the circulated water is vaporized. The vaporized water or wet steam is thereafter fed through the insulated conduit member 34 to the steam engine which is mounted within the watertight casing 23. The passage of steam through the non-condensing steam engine (or steam turbine) effects the operation thereof and maintains the engine in a continuously operable state. The steam engine in turn supplies power to a diagrammatically represented generator 51 (not shown in FIGURE 1), the air compressor and the water pump, to which the engine is mechanically coupled.

The generator 51 supplies electrical energy for the operation of the motor 43 which can be utilized to drive the sphere rotation propeller 44 and orient the sphere. Additionally, power is supplied from the generator to a control system generally designated by the numeral 52. In general, the control system 52 includes a conventional instrumentation package and a servo-mechanism system, which are utilized to control such factors as the depth at which the sound source is submerged and the period between successive sound producing actuations of the piston 17.

The air compressor mounted within the housing 22 is, in a similar manner, continually driven by the steam engine. Therefore, a supply of compressed air is maintained within the tank. This supply of compressed air serves as the driving force for the piston 17 and supplies the necessary pressure to actuate the pneumatic return reel. Compressed air supplied to the tank upon reaching a preselected magnitude, effects the opening of a valve and is thereby exhausted from the tank to impart a substantial force to the piston 17. Consequently, the piston is accelerated toward the reinforced section 10a of the outer sphere 10 and strikes this section after attaining a moderately high velocity. The impact of the piston 17 with a suitable stopping material, which is mounted over the reinforced section of the sphere, creates an intense low frequency vibration of the outer sphere and, accordingly, results in the production of an intense low frequency sound pulse. The stopping material, which is rubber in a preferred embodiment of the invention, prolongs the duration of the impulse imparted to the reinforced section of the sphere. The duration of this impulse, which would be extremely sharp if the stopping material were not provided, will be determined by the compressibility and thickness of the stopping material. Upon completion of the forward stroke, the pneumatically operated return reel is rendered effective to rewind the flexible cable 19 and return the piston 17 to an initial position.

As previously described, water is continuously pumped through the reactor to generate steam and to effect a cooling thereof during the intermittent actuation of the piston. The steam produced by the reactor is passed through the steam engine (or steam turbine) and is exhausted thereby into the space between the inner and outer spheres. This space is diagarmmatically represented in FIGURE 2 as a condenser designated by the numeral 53. The condensate resulting from the passage of steam within the space between the inner and outer spheres accumulates at the lowermost portion of the underwater sound source and provides the necessary supply of water to maintain the apparatus in a state of continuous operation.

A specific embodiment of an underwater sound source utilizing the principal features of the invention hereinbefore described is proportioned so as to have an outer diameter of approximately 30 feet. The shell of the outer sphere is constructed with a thickness of approximately one inch, which increases at the reinforced section 10a to approximately four inches. Similarly, the inner sphere 11 is constructed with a thickness of approximately one inch and is proportioned to a diameter of approximately 25 feet. Accordingly, a uniform 2½ foot space is provided between the two spheres, excluding the area adjacent the reinforced section of the outer sphere.

Steam is constantly being exhausted into the space between the inner and outer sphere by the Corliss engine; accordingly, the exposed walls of these steel spherical members are coated with a material which precludes iron from entering the circulating steam producing cooling system for the reactor. Any number of plasticized substances can be utilized to coat the exposed walls of the inner and outer spheres as long as such coating material is capable of withstanding the effects of vibration, ambient temperature and of the condensation process being accomplished therein.

In order to produce the necessary intense underwater sound pulse, the heavy piston 17 is proportioned with a diameter of approximately one foot and is approximately two feet in length. The hammer is accelerated by pneumatic pressure built up within the tank to a pressure of approximately 500 pounds per square inch. This pressure is sufficient to accelerate the piston to a velocity of approximately 240 feet per second during the passage thereof through a distance of approximately 15 feet.

Sufficient power to maintain the piston driving air compressor in an operable state for prolonged intervals is provided by the steam engine (or steam turbine). As previously described, the steam engine is supplied with steam from the reactor 32, which steam is maintained at a pressure of approximately 250 p.s.i. and a temperature of 205° C. A 10–50 kw. (Electrical) reactor is suitable for producing such a supply of steam from the steam engine if the fuel elements of the reactor are maintained at approximately 400° C.

The diagrammatically represented reactor 32 which effects the production of the necessary supply of steam is preferably provided with a core that is proportioned with a diameter of approximately 24" and a height of 14". The reactor is provided with approximately 110 tubular shaped fuel elements composed of an alloy of zirconium hydride ($ZrH_{1.5}$) and enriched uranium (approximately 20% $U_{235}$) in weight proportions of 92% and 8%, respectively. In addition, approximately 6 cylindrical burnable poison rods containing $Gd_2O_3$ with $Al_2O_3$ are disposed in the reactor core. The single control rod which controls the power level of the reactor is of cruciform shape and disposed for selective movement within a single aperture provided in the center of the lower portion of the core.

The "boiling water" reactor 32 bears a certain similarity to the water cooled nuclear reactor disclosed and claimed in the co-pending application of the common assignee, Serial No. 732,415, which was filed May 9, 1958. The structural distinctions between the reactor disclosed in the aforementioned co-pending application and that contemplated for use in the present invention (i.e. larger core diameter, the use of water as a reflector, and the provision of burnable poison rods for extending fuel core life) are required so that the reactor 32 can operate as a "boiling water" reactor and produce the required supply of steam.

Both the reactor 32 and the reactor disclosed in the previously filed application are characterized by a prompt negative temperature coefficient of reactivity which insures reliable operation coupled with inherently stable control of reactor power.

Such factors as the operating temperature of the reactor 32, the period between successive sound pulses and the orientation of the sound source 9 under the control of the rotation propeller 42 are readily controlled by conventional devices within the control system 52. The servomechanism system is adapted to actuate the control rod for the reactor 32 and, additionally, is utilized to control the operation of a suitable blow tank system (not shown) in response to a coded signal so that the sound source can be brought to the surface when desired.

The instrumentation package, which also forms a part of the control system 52, is utilized to provide coded control signals for the servo system and to measure temperature, salinity or other characteristics of the water wherein the sound source is submerged as a function of time. Moreover, the control system 52 can include any number of commercially available electronic instruments to adapt the sound source for use as a sonar device or as a part of a sound navigational device similar in principle to a radio Loran system.

The periodic actuation of the piston 17 under pneumatic pressure supplied from the compressed air tank, which is in turn controlled by the instrumentation package in a conventional manner, produces a sound pulse having a frequency of approximately 275 cycles per second which can effectively travel over distances substantially greater than heretofore realized. It is estimated that the listening range of a reactor powered sound source of the type hereinbefore described would be approximately 2000 miles in an operating underwater ocean sound channel.

It should be understood that the above described embodiment is simply illustrative of an application of the invention. Numerous other arrangements of the described structural features may be readily devised by those skilled in the art which would embody the principles of the invention and fall within the spirit and scope thereof. Various features of the invention are set forth in the following claims.

What is claimed is:

1. A submersible watertight device for producing intense underwater sound pulses, which comprises an outer watertight vessel, a vibratable diaphragm forming at least a portion of said outer vessel, an inner vessel mounted in concentric spaced relation within said outer vessel, an acceleratable mass mounted within said inner vessel for movement relative thereto, a reactor mounted within said inner vessel, circulating means communicating with said reactor for supplying a water coolant to said reactor during the operation thereof so that said reactor effects the production of a supply of steam, means connected to said reactor for generating pneumatic power from the supply of steam produced by said operating reactor to periodically accelerate said mass into engagement with said diaphragm whereby periodic intense low frequency sound waves are produced, means connected to said pneumatic power generating means for returning said mass to an initial position within said vessel subsequent to each periodic acceleration thereof into engagement with said diaphragm, and means mounted on said outer vessel and driven by a portion of the power derived from the supply of steam for selectively orienting the submersible device during production of said intense low frequency sound waves.

2. A submersible watertight device for producing intense underwater sound pulses, which comprises an outer watertight vessel, a vibratable diaphragm forming at least a portion of said outer vessel, an inner vessel mounted within said outer vessel, said inner vessel being mounted in concentric relation with said outer vessel to provide a space between said inner and outer vessels wherein a supply of water is maintained, pulse producing means mounted within said inner vessel for movement relative thereto from an initial position into vibration producing engagement with said diaphragm, a reactor mounted within said inner vessel, means communicating with said reactor for circulating water from the space between said inner and outer vessels through said reactor during the operation thereof whereby the production of a supply of steam is effected, means connected to said reactor for generating pneumatic power from the supply of steam produced by the circulation of water through said operating reactor to periodically accelerate said pulse producing means into engagement with said diaphragm, the engagement of said pulse producing means with said diaphragm effecting the intense vibration thereof and the production of low frequency sound waves in the underwater medium wherein the device is submerged, and means connected to said pneumatic power generating means and said pulse producing means for returning said pulse producing means to an initial position within said vessel subsequent to each acceleration thereof into engagement with said diaphragm.

3. A submersible watertight device for producing intense underwater sound pulses, which comprises an outer watertight vessel, a vibratable diaphragm forming at least a portion of said outer vessel, an inner vessel mounted within said outer vessel, said inner vessel being mounted in concentric relation with said outer vessel to provide a space between said inner and outer vessels wherein a supply of water is maintained, pulse producing means mounted within said inner vessel for movement relative thereto from an initial position into vibration producing engagement with said diaphragm, a boiling water reactor mounted within said inner vessel, means communicating with said reactor for circulating water from the space between said inner and outer vessels through said boiling water reactor during the operation thereof whereby the production of a supply of steam is effected, means connected to said reactor for generating pneumatic power from the supply of steam produced by the circulation of water through said operating reactor to periodically accelerate said pulse producing means into engagement with said diaphragm, the engagement of said pulse producing means with said diaphragm effecting the intense vibration thereof and the production of low frequency sound waves in the underwater medium wherein the device is submerged, means connected to said pneumatic power generating means for returning said pulse producing means to an initial position within said vessel subsequent to each acceleration thereof into engagement with said diaphragm, and means mounted on said outer vessel driven by a portion of the power derived from the supply of steam for selectively orienting the submersible device during production of the intense low frequency sound waves.

4. A submersible device for producing underwater sound pulses comprising an outer watertight vessel with a vibratable diaphragm forming at least a portion of said outer vessel, an inner vessel mounted within said outer vessel in spaced relation thereto so as to provide a space between said inner and outer vessels for containing a supply of a liquid, an acceleratable mass mounted within said inner vessel for movement relative thereto from an initial position within said inner vessel to a second position in engagement with said diaphragm, a nuclear reactor mounted within said inner vessel, circulating means communicating with the space containing the supply of liquid and with said reactor for circulating the liquid from the space between said inner and outer vessels through said reactor during the operation thereof whereby the liquid is vaporized, pneumatic power generating means connected to said reactor for generating pneumatic power from the vaporized liquid produced by said operating reactor, mass accelerating means responsive to pneumatic power and connected to said mass for accelerating said mass into engagement with said diaphragm whereby sound waves are produced, mass returning means responsive to pneumatic power and connected to said mass for returning said mass to said initial position within said inner vessel subsequent to each acceleration thereof into engagement with said diaphragm, and a conduit connecting said pneumatic power generating means with said mass accelerating means and said mass returning means for transferring said pneumatic power to said mass accelerating means and said mass returning means.

5. A submersible device for producing underwater sound pulses comprising an outer watertight vessel with a vibratable diaphragm forming at least a portion of said outer vessel, an inner vessel mounted within said outer vessel in spaced relation thereto so as to provide a space between said inner and outer vessels for containing a supply of a liquid, an acceleratable mass mounted within said inner vessel for movement relative thereto from an initial position within said inner vessel to a second position in engagement with said diaphragm, a nuclear reactor mounted within said inner vessel, circulating means communicating with the space containing the supply of liquid and with said reactor for circulating the liquid from the space between said inner and outer vessels through said reactor during the operation thereof whereby the liquid is vaporized, pneumatic power generating means connected to said reactor for generating pneumatic power from the vaporized liquid produced by said operating reactor, mass accelerating means responsive to pneumatic power and connected to said mass for accelerating said mass into engagement with said diaphragm whereby sound waves are produced, mass returning means responsive to pneumatic power and connected to said mass for returning said mass to said initial position within said inner vessel subsequent to each acceleration thereof into engagement with said diaphragm, a conduit connecting said pneumatic power generating means with said mass accelerating means and said mass returning means for transferring said pneumatic power to said mass accelerating means and said mass returning means, and vapor returning means communicating with said pneumatic power generating means for returning said vaporized liquid to the space between said inner and outer vessels so that the vaporized liquid is condensed by the transfer of heat through said outer vessel to the surrounding body of water.

6. A submersible device for producing underwater sound pulses comprising an outer watertight vibratable vessel, an inner vessel, supporting means connected between said inner and outer vessels to support said vessels in spaced apart relation so as to provide a space between said inner and said outer vessels for containing a supply of a liquid, said supporting means being formed and arranged so as not to transmit vibrations of said outer vessel to said inner vessel, an acceleratable mass mounted within said inner vessel for movement relative thereto from an initial position within said inner vessel to a second position in engagement with said outer vessel, a nuclear reactor mounted within said inner vessel, circulating means communicating with the space containing the supply of liquid and with said reactor for circulating the liquid from the space between said inner and outer vessels through said reactor during the operation thereof whereby the liquid is vaporized, pneumatic power generating means connected to said reactor for generating pneumatic power from the vaporized liquid produced by said operating reactor, mass accelerating means responsive to pneumatic power and connected to said mass for accelerating said mass into engagement with said outer vessel whereby sound waves are produced, mass returning means responsive to pneumatic power and connected to said mass for returning said mass to said initial position within said inner vessel subsequent to each acceleration thereof into engagement with said outer vessel, a conduit connecting said pneumatic power generating means with said mass accelerating means and said mass returning means for transferring said pneumatic power to said mass accelerating means and said mass returning means, and vapor returning means communicating with said pneumatic power generating means for returning said vaporized liquid to the space between said inner and outer vessels so that the vaporized liquid is condensed by the transfer of heat through said outer vessel to the surrounding body of water.

References Cited by the Examiner

UNITED STATES PATENTS

| 2,172,066 | 9/39 | Logsdon | 340—5 |
|---|---|---|---|
| 2,395,862 | 3/46 | Freeman et al. | 116—27 |
| 2,407,697 | 9/46 | Williams | 116—27 |
| 2,901,997 | 9/59 | Brooks | 116—27 |
| 3,008,889 | 11/61 | Junkins | 204—193.2 |
| 3,012,957 | 12/61 | Spooner | 204—193.2 |
| 3,037,475 | 6/42 | Mickley | 116—26 |

FOREIGN PATENTS 183,330   7/22   Great Britain.

LOUIS J. CAPOZI, *Primary Examiner.*

CARL W. ROBINSON, *Examiner.*